United States Patent Office 3,531,187
Patented Sept. 29, 1970

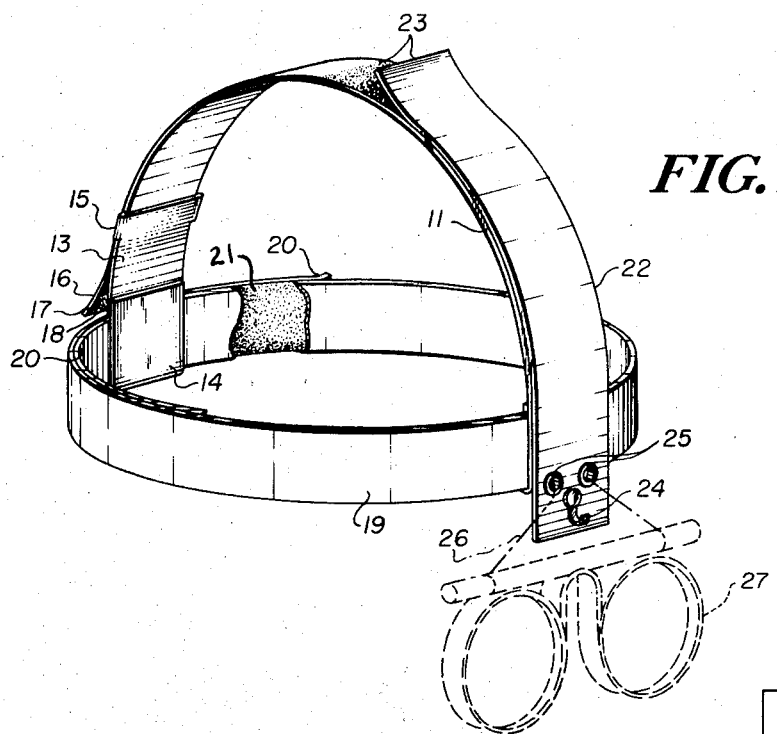
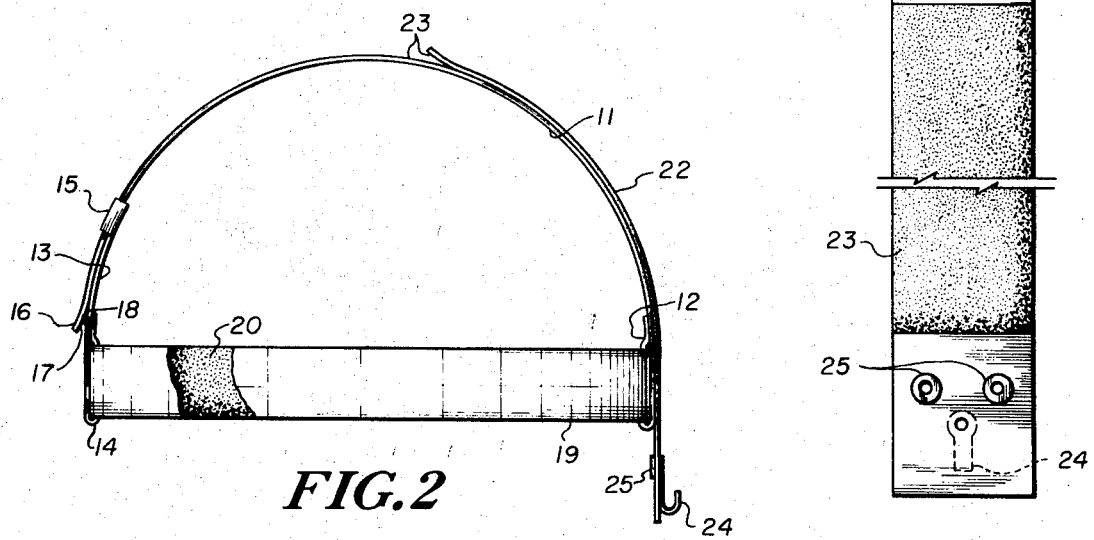
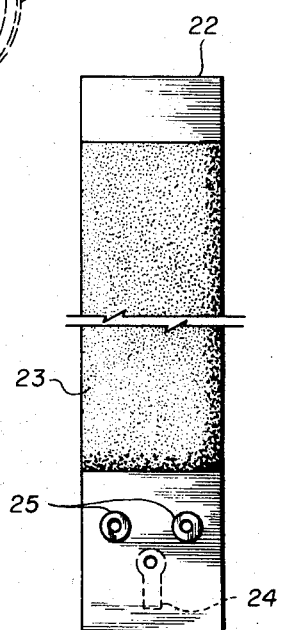

3,531,187
EYE TEST FRAME SUPPORT
William H. Brown, 503 1st Ave.,
Elizabeth, N.J. 07206
Filed Aug. 27, 1968, Ser. No. 755,676
Int. Cl. A61b *3/04;* G02c *3/00*
U.S. Cl. 351—19                                    2 Claims

ABSTRACT OF THE DISCLOSURE

A test frame support which is lightweight and comfortable, providing a latitudinal girth strap for the cranium above the brow; interengaging ends on the girth strap adjustable to suit the cranium; longitudinal straps with interengaging inner end portions and outer end portions attached to the girth strap to maintain the latitudinal girth strap above the brow; a support strap adjustably attached to the longitudinal strap and attachable to suspend a test frame support.

BACKGROUND OF THE INVENTION

This invention relates generally to test frame supports and particularly to test frame supports which are lightweight, comfortable, latitudinally and longitudinally adjustable with respect to the cranium, and provide a support strap for a test frame that will relieve the subject tested from discomfort and inconvenience by gently distributing the weight of the test frame over a large area of the cranium.

In the drawings it is noted that:
FIG. 1 is a perspective view of a test frame support illustrative of the invention;
FIG. 2 is a side elevational view thereof; and
FIG. 3 is a rear elevational view of a portion of a support strap.

In the fitting of lenses to the human eye, a test frame is placed in front of the eyes and various lenses are inserted therein so that the subject being tested may inform the person doing the testing concerning the suitability of the lenses. It is particularly important that the frame be precisely adjusted to properly position the lenses before the subject's eyes. Since the test frame may be uncomfortable and inconvenient to sustain upon the bridge of the nose, and once there, it may be difficult to secure it in the exactly proper position, adjustable test frame supports have been devised. These are difficult to adjust, heavy, inconvenient, are inclined to slip and move out of adjustment, and may cause considerable discomfort to the subject being tested.

SUMMARY OF THE INVENTION

It has been found that a test frame support may be devised of lightweight fabric materials which may easily be adjusted to all of the various cranial dimensions normally encountered. Once having been so adjusted, it will maintain its adjustment. The adjustment may be made with ease and the subject using the test frame mounting will find it comfortable to wear. Moreover, having once been applied to a subject, the test frame support can be readily set to maintain the test frame at exactly the proper position with respect to the eyes of the subject. Since the test frame support may be made of fabric which is soft and lightweight, its comfortable character will become readily apparent.

PREFERRED EMBODIMENT

Referring now to the drawings in detail, there is provided a front longitudinal strap 11. This strap is preferably made of a fabric strip, such as buckram, but it also may be made of paper, flexible plastic material, or thin strips of metal. The front longitudinal strap is provided with a loop 12 on its front end, and the loop 12 is disposed on the bottom thereof having a passage therethrough in a horizontal direction. There is also provided a rear longitudinal strap 13. The rear longitudinal strap 13 is also provided with a horizontally disposed bottom loop 14. There is also on the rear longitudinal strap 13, a top loop 15 which has a passage therethrough extending in a general vertical direction. The rear end 16 of the front longitudinal strap 11 is passed through the vertical top loop 15 of the rear longitudinal strap 13 and it overlaps at least a part of the rear longitudinal strap 13. The opposing portions of the rear longitudinal strap 13 and the front longitudinal strap 11 are provided with complementary self-engaging faces for adjustable engagement and disengagement in order to vary the longitudinal adjustment of the test frame support. These opposing portions 17, 18 may be provided with the complementary self-engaging faces of a raised nylon pile having on the one hand, resilient hooks and on the other hand, loops, as referred to in U.S. Pat. No. 2,717,437 of Mestral, Sept. 13, 1955. Other types of self-engaging fasteners may be substituted.

A latitudinal strap 19 passed through the horizontal loop 12 extends around and has its ends 20, 20 passed in opposite directions through the horizontal loop 14.

The interfaces between the ends 20, 20 are provided with opposing complementary self-engaging faces 21 of the kind heretofore referred to, for adjustable engagement and disengagement wherein hemispherical girth may be increased or decreased in order to suit the cranial dimensions of the wearer. A separate support strap 22 is provided. This support strap 22 overlies at least a portion of the front longitudinal strap 11. The interface, or opposing faces of the support strap 22 and the front longitudinal strap 11 are provided with complementary self-engaging faces of the same material hereinbefore referred to. In this manner, the support strap 22 may be disengaged from longitudinal strap 11 and raised and lowered to suit the cranial dimensions of the subject wearing the test frame support. In an effort to provide universality by reason of differences arising between various test frames, the support strap 22 is provided, by way of illustration, with a hook 24 upon which may rest a particular style of test frame. Also there are provided eyelets 25 through which may be inserted, a cord 26 by means of which the test frame of a different type 27 may be adjustably attached to the support strap 22. By engaging and disengaging the self-engaging faces 23, the support strap may be adjusted easily and vertically, to provide the precise level at which the test frame 27 is desired to be positioned with respect to the eye of the subject.

Since the test frame support may be made of fabric which is lightweight and comfortable, the test frame support will not be oppressive to the wearer. Since the test frame support is dimensionally adjustable not only as to girth but as to cranial height, a test frame support is provided which is suitable for use on persons with all size head dimensions, and also is adaptable to various bouffant hair styles affected by members of the female sex. Since the test frame strap 22 is attachable and detachable, it may be readily applied and disengaged from the other members of the test frame support to provide adjustments without disturbing the adjustments of the other members. By reason of the mountings provided, the support strap 22 can be readily adapted to many types of test frames.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed:
1. A test frame support comprising
(a) a front longitudinal strap,
(b) a horizontal bottom loop on the front end of the front longitudinal strap,
(c) a rear longitudinal strap,
(d) a horizontal bottom loop and a generally vertical top loop on the rear longiutdinal strap,
(e) the rear end of the front longitudinal strap passed through the vertical top loop of the rear longitudinal strap and overlapping at least a part of the rear longitudinal strap.
(f) the opposing portions of the rear longitudinal strap and the front longitudinal strap provided with complementary self-engaging, faces for adjustable engagement and disengagement longitudinally,
(g) a latitudinal strap passed through the horizontal loop on the front end of the front longitudinal strap, and the ends of the latitudinal strap both passed through the horizontal bottom loop on the rear longitudinal strap and the ends overlapped with each other,
(h) the overlapped ends of the latitudinal strap and the opposed portions of the strap itself, provided with complementary self-engaging faces for adjustable engagement and disengagement latitudinally,
(i) a support strap overlying at least a portion of the front longitudinal strap,
(j) the opposing faces of the support strap and the front longitudinal strap provided with complementary, self-engaging faces, for adjustable engagement and disengagement to position the test frame,
(k) means on the support strap for attaching and suspending a test frame.

2. A test frame support comprising
(a) a front, soft, flexible, longitudinal strap,
(b) a horizontal, integral bottom loop on the front end of the front longitudinal strap.
(c) a rear soft, flexible, longitudinal strap,
(d) a horizontal, integral, bottom loop, and a generally vertical top loop on the rear longitudinal strap,
(e) the rear end of the front longitudinal strap passed through the vertical top loop of the rear longitudinal strap and overlying at least a part of the rear longitudinal strap,
(f) the overlying portions of the rear longitudinal strap and the front longiutdinal strap, provided with complementary, self-engaging faces for adjustable engagement and disengagement longitudinally,
(g) a latitudinal strap passed through the horizontal loop on the front end of the front longitudinal strap,
(h) the ends of the latitudinal strap both passed through the horizontal bottom loop on the rear longitudinal strap, and the ends overlapped with each other,
(i) the overlapped ends of the latitudinal strap and the opposed portions of the strap itself provided with complementary self-engaging faces for adjustable engagement and disengagement latitudinally,
(j) a support strap overlying at least a portion of the front longitudinal strap,
(k) the opposing faces of the support strap and the front longitudinal strap provided with complementary self-engaging faces, for adjustable engagement and disengagement to position the test frame,
(l) means on the support strap for attaching and suspending a test frame.

References Cited

UNITED STATES PATENTS

| | | | |
|---|---|---|---|
| 916,109 | 3/1909 | Cook | 2—14 |
| 1,328,669 | 1/1920 | Harm | 351—19 |
| 1,930,972 | 10/1933 | Griswold | 2—15 |
| 2,504,524 | 4/1950 | Hayward | 2—14 |
| 2,526,582 | 10/1950 | Rowan | 2—14 X |
| 2,635,239 | 4/1953 | Bivens | 351—156 X |
| 2,659,266 | 11/1953 | Swisher | 351—19 X |
| 2,757,574 | 8/1956 | Thorburn | 351—156 X |
| 2,848,924 | 8/1958 | Potez | 350—146 X |
| 3,009,235 | 11/1961 | Mestral. | |

DAVID SCHONBERG, Primary Examiner

P. A. SACHER, Assistant Examiner

U.S. Cl. X.R.

2—8; 351—155